No. 609,160. Patented Aug. 16, 1898.
T. G. McWITHEY.
CORN POPPER.
(Application filed Oct. 26, 1897.)
(No Model.)
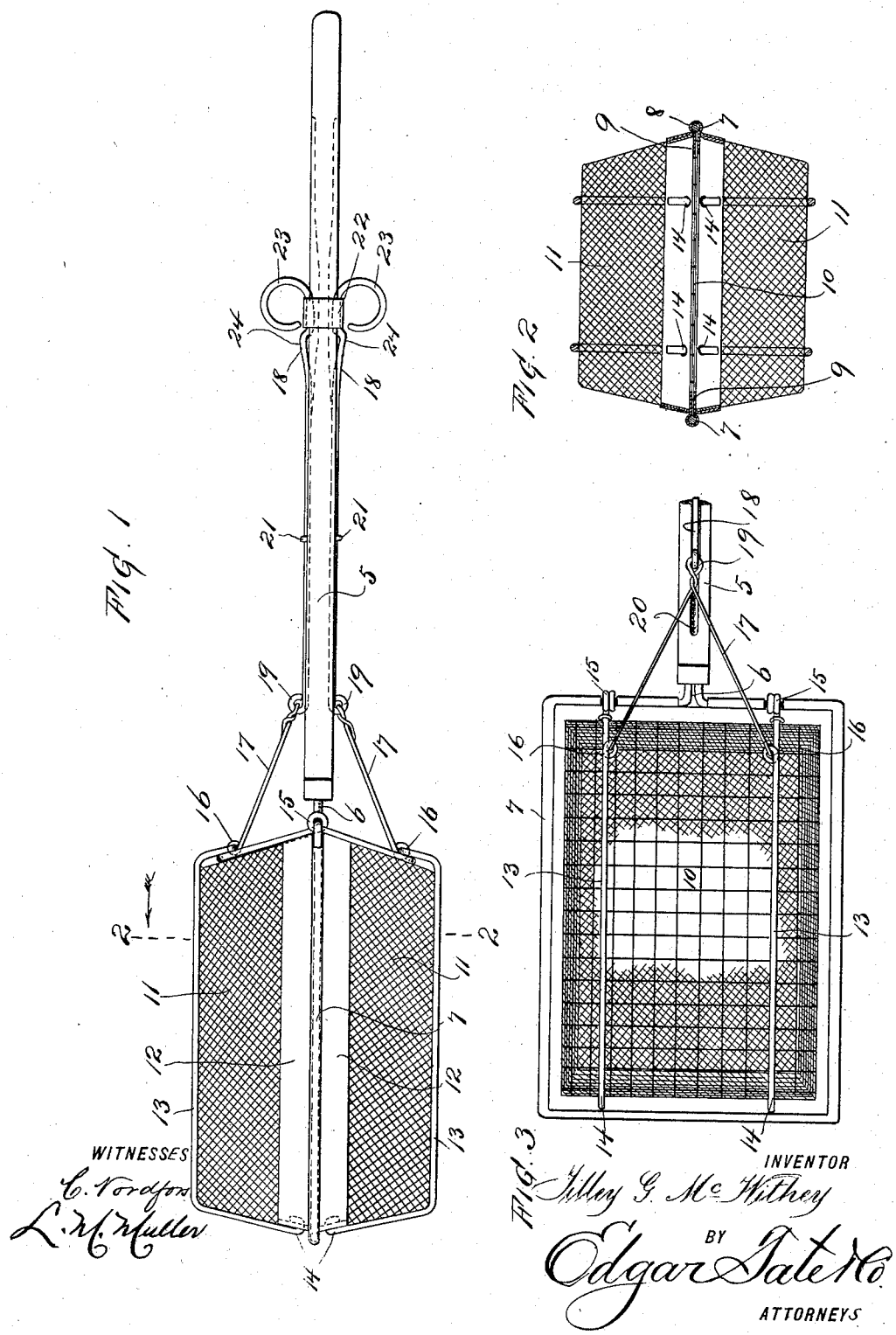
WITNESSES
C. Vordson
L. M. Muller
INVENTOR
Tilley G. McWithey
BY
Edgar Tate & Co.
ATTORNEYS

UNITED STATES PATENT OFFICE.

TILLEY GILBERT McWITHEY, OF CLOQUET, MINNESOTA.

CORN-POPPER.

SPECIFICATION forming part of Letters Patent No. 609,160, dated August 16, 1898.

Application filed October 26, 1897. Serial No. 656,446. (No model.)

*To all whom it may concern:*

Be it known that I, TILLEY GILBERT MC-WITHEY, a citizen of the United States, residing at Cloquet, in the county of Carlton and State of Minnesota, have invented certain new and useful Improvements in Corn-Poppers, of which the following is a full and complete specification, such as will enable those skilled in the art to which it appertains to make and use the same.

This invention relates to corn-poppers; and the object thereof is to provide an improved device of this class which is simple in construction and operation and of much greater capacity than devices of this class as usually constructed.

The invention is fully disclosed in the following specification, of which the accompanying drawings form a part, in which—

Figure 1 is a side view of my improved corn-popper; Fig. 2, a cross-section on the line 2 2, and Fig. 3 a view at right angles to Fig. 1.

In the drawings forming part of this specification the separate parts of my improvement are designated by the same numerals of reference in each of the views, and in practice I provide a handle 5, to which is rigidly secured at 6 a frame 7, which is composed of wire covered with sheet metal, as shown at 8, and said frame is provided with an inwardly-directed flange 9, which is composed of the same material, and the interior of said frame is filled in with a coarse-wire screen 10, the mesh of which is of such size as to admit the passage of the pop-corn therethrough. I also provide two wire-screen receptacles 11, the mesh of which is much smaller than that of the frame 7, and said receptacles are of the usual form and are open at one side, and the open side thereof is placed adjacent to the central frame 7, and these receptacles are provided, around the open side thereof, with frames 12, which may be composed of sheet metal, wire, or any suitable material, and passing around said receptacles longitudinally are wires or rods 13, which are connected with the frames 12 at one end, as shown at 14, and these wires or rods are hinged to the frame 7 at 15, and pivotally connected therewith or hinged thereto at 16 are yoke-shaped wires 17, each of which is pivotally connected with or hinged to a wire or rod 18, as shown at 19.

The wires or rods 18 are placed in grooves 20, formed in the opposite sides of the handle 5, and said grooves are provided with loops or staples 21, which hold said wires or rods in place, and adjacent to the outer end of the handle 5 is placed a ring or band 22, beneath which said wires or rods 18 are passed, and each of said wires or rods is provided at its end with a ring 23.

The wires or rods 18 are free to slide in the grooves 20, and said wires or rods are each provided near its outer end with a loop or angular bend 24, which in the normal position of the parts, or that shown in Fig. 1, is adjacent to the ring or band 22, and when the parts are in this position the separate receptacles 11 are closed against the central frame, as shown in Fig. 1.

In practice I place from two to three times as much corn in one of the receptacles 11 as is usually placed in an ordinary popper of the same size, and the device is manipulated in the usual manner until said receptacle is full or nearly full of popped corn. The popper is then turned over and agitated until all the unpopped corn passes through the central frame and into the other receptacle 11. The rod 18, connected with the receptacle in which the popped corn is, is then pulled outwardly, and said receptacle turns or opens on its hinge at 15, and the pop-corn may be emptied into any suitable vessel. The said receptacle is then closed again and the corn is popped in the other receptacle until said receptacle is full of popped corn, after which the above-described operation is repeated. By means of this arrangement a great deal more corn may be put in the popper than in an ordinary popper, and there is no danger of burning the corn either before or after it is popped.

My improved corn-popper is simple in construction and operation, and by means thereof corn may be much more rapidly popped, and that which is popped can be conveniently separated from that which is not, and it will be apparent that changes in and modifications of the construction herein described may be made without departing from the spirit of my invention or sacrificing its advantages.

Having fully described my invention, I claim as new and desire to secure by Letters Patent—

1. A corn-popper, comprising a screen having a handle rigidly secured to one end thereof, a screen receptacle on each side of said screen, and hinged to the end thereof with which the handle is connected, operating-rods connected with the hinged ends of the screen receptacles and extending longitudinally along said handle, said rods being provided at their ends with loops or rings forming handles by which they may be operated, a locking device for holding the screen receptacles in a closed position, consisting of a ring or band mounted on the handle, and through which said rods pass, and bends or loops formed in said rods, substantially as shown and described.

2. A corn-popper, comprising a screen having a handle rigidly secured thereto, a screen receptacle on each side of said screen and hinged to the side thereof with which the handle is connected, operating-rods connected with the hinged ends of the screen receptacles and extending longitudinally along said handle and between the same and an encircling guide, finger-pieces on the ends of said operating-rods, and shoulders upon said operating-rods to engage the guide and hold the screen receptacles closed against the screen, substantially as described.

3. A corn-popper comprising a screen having a handle rigidly secured thereto, a screen receptacle on each side of said screen and hinged to the side thereof with which the handle is connected, yokes connected with the hinged ends of the screen receptacles, operating-rods situated within longitudinal grooves in said handle and connected with said yokes, a guide encircling the handle near the outer ends of said operating-rods, finger-pieces at the ends of said operating-rods, and shoulders thereon to engage said guide and hold the screen receptacles closed against the screen, substantially as described.

In testimony that I claim the foregoing as my invention I have signed my name, in presence of the subscribing witnesses, this 19th day of October, 1897.

TILLEY GILBERT McWITHEY.

Witnesses:
 FRANK B. POOLE,
 WM. WILSON.